(12) United States Patent
Kamthe

(10) Patent No.: US 9,398,039 B2
(45) Date of Patent: Jul. 19, 2016

(54) APPARATUS, SYSTEM AND METHOD FOR SUPPRESSING ERRONEOUS REPORTING OF ATTACKS ON A WIRELESS NETWORK

(71) Applicant: Aruba Networks, Inc., Sunnyvale, CA (US)

(72) Inventor: Ankur Kamthe, Sunnyvale, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 126 days.

(21) Appl. No.: 13/928,150

(22) Filed: Jun. 26, 2013

(65) Prior Publication Data

US 2014/0283062 A1 Sep. 18, 2014

Related U.S. Application Data

(60) Provisional application No. 61/793,825, filed on Mar. 15, 2013.

(51) Int. Cl.
*H04L 29/06* (2006.01)
*H04W 12/12* (2009.01)
*H04W 84/12* (2009.01)

(52) U.S. Cl.
CPC .......... *H04L 63/1425* (2013.01); *H04W 12/12* (2013.01); *H04W 84/12* (2013.01)

(58) Field of Classification Search
CPC .. H04L 63/1425; H04W 12/12; H04W 84/12; H04W 88/12; H04W 88/00
USPC ........................................................ 726/23
See application file for complete search history.

(56) References Cited

U.S. PATENT DOCUMENTS

| | | | |
|---|---|---|---|
| 6,801,756 B1 * | 10/2004 | Agrawal et al. | 455/67.11 |
| 7,213,077 B2 * | 5/2007 | Border | 709/234 |
| 8,363,549 B1 * | 1/2013 | Zhu et al. | 370/235 |
| 8,627,074 B1 * | 1/2014 | Goel et al. | 713/168 |
| 2004/0103278 A1 * | 5/2004 | Abhishek et al. | 713/160 |
| 2005/0083838 A1 * | 4/2005 | Kandala | 370/230 |
| 2005/0276230 A1 * | 12/2005 | Akahane et al. | 370/252 |
| 2006/0187840 A1 * | 8/2006 | Cuffaro et al. | 370/235 |
| 2008/0151762 A1 * | 6/2008 | Armstrong et al. | 370/241 |
| 2010/0299725 A1 * | 11/2010 | Yamada | H04L 1/1607 726/4 |
| 2011/0099633 A1 * | 4/2011 | Aziz | 726/24 |
| 2013/0117852 A1 * | 5/2013 | Stute | 726/23 |
| 2014/0283062 A1 * | 9/2014 | Kamthe | 726/23 |

OTHER PUBLICATIONS

Wenyu Jiang, "Bit Error Correction without Redundant Data: aMAC Layer Technique for 802.11 Networks", 2006, IEEE, 0-7803-9550-6/06.*

(Continued)

*Primary Examiner* — Syed Zaidi
(74) *Attorney, Agent, or Firm* — Hewlett Packard Enterprise Patent Department

(57) ABSTRACT

According to one embodiment, a method for suppressing erroneous alert messages for suspected network attacks comprises a first operation of determining an intrusion event. This may be conducted at a first network device. Then, the intrusion event is verified prior to transmission of the alert message. The verification may be conducted at a second network device. Thereafter, transmission of the alert message is suppressed in response to verifying that the intrusion event has been erroneously determined.

18 Claims, 6 Drawing Sheets

(56) References Cited

OTHER PUBLICATIONS

Oshima, Shunsuke, and Takuo Nakashima. "Performance evaluation for linux under syn flooding attacks." Innovative Computing, Information and Control, 2007. ICICIC'07. Second International Conference on. IEEE, 2007.*

Go, Y., Kune, D. F., Woo, S., Park, K., & Kim, Y. (Feb. 2013). Towards accurate accounting of cellular data for TCP retransmission. In Proceedings of the 14th Workshop on Mobile Computing Systems and Applications (p. 2). ACM.*

Könings, Bastian, et al. "Channel switch and quiet attack: New DoS attacks exploiting the 802.11 standard." Local Computer Networks, 2009. LCN 2009. IEEE 34th Conference on. IEEE, 2009.*

* cited by examiner

APPARATUS, SYSTEM AND METHOD FOR SUPPRESSING ERRONEOUS REPORTING OF ATTACKS ON A WIRELESS NETWORK

CROSS-REFERENCE TO RELATED APPLICATIONS

This application claims the benefit of U.S. Provisional Patent Application Ser. No. 61/793,825, filed on Mar. 15, 2013, the entire contents of which are incorporated by reference.

TECHNICAL FIELD

Embodiments of the present disclosure relate to intrusion detection within a network. In particular, the present disclosure relates to an apparatus, system and method for enhancing the accuracy of intrusion detection through the correlation and application of information gathered by a network device in order to suppress erroneous reporting of suspected network attacks.

GENERAL BACKGROUND

In accordance with the current network infrastructure, an access point (AP) is adapted to receive and subsequently process a series of wireless data frames from other network devices, such as client devices. In supporting intrusion detection, the AP is configured to analyze each incoming data frame to determine if that data frame is associated with suspicious activity, such as a network attack that is targeted to degrade communications between the AP and its wirelessly associated client devices. Based on this analysis, upon determining that an incoming data frame may be part of a suspected attack, the AP transmits a warning message to a centralized controller to indicate that an attack may be in process.

In response to receipt of the warning message, the controller may, without further analysis, issue an alert to the network administrator. Where the access point, normally with limited processing capabilities due to cost constraints, makes an error by falsely detecting a network attack, there is no intrusion detection verification being conducted to avoid erroneously issuing alerts. This is problematic because, upon continuous receipt of erroneous alerts over time, the network administrator may become desensitized as to the importance of each alert, which jeopardizes the overall health of the network.

In accordance with current intrusion detection scheme, to suppress repeated alerts that may occur for a suspected attack involving a series of consecutive data frames, current APs may perform a time-out operation in which the AP halts the transmission of alerts associated with the suspected attack for a predetermined duration. While this technique suppresses repeated alerts for the same attack, it also reduces the security of the network for that predetermined duration.

In the near future, a new wireless communication standard will be released, namely the Institute of Electrical and Electronics Engineers (IEEE) 802.11ac Standard. As a result, to comply with the IEEE 802.11ac Standard, network equipment manufacturers will need to develop products that support even faster access in an enterprise network environment. Hence, the management of data processing consumption will be extremely important, and thus, more accurate intrusion detection, which requires a greater amount of data processing by the AP, will not be a viable option unless changes are made to the intrusion detection scheme that does not require increased processing by the AP.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
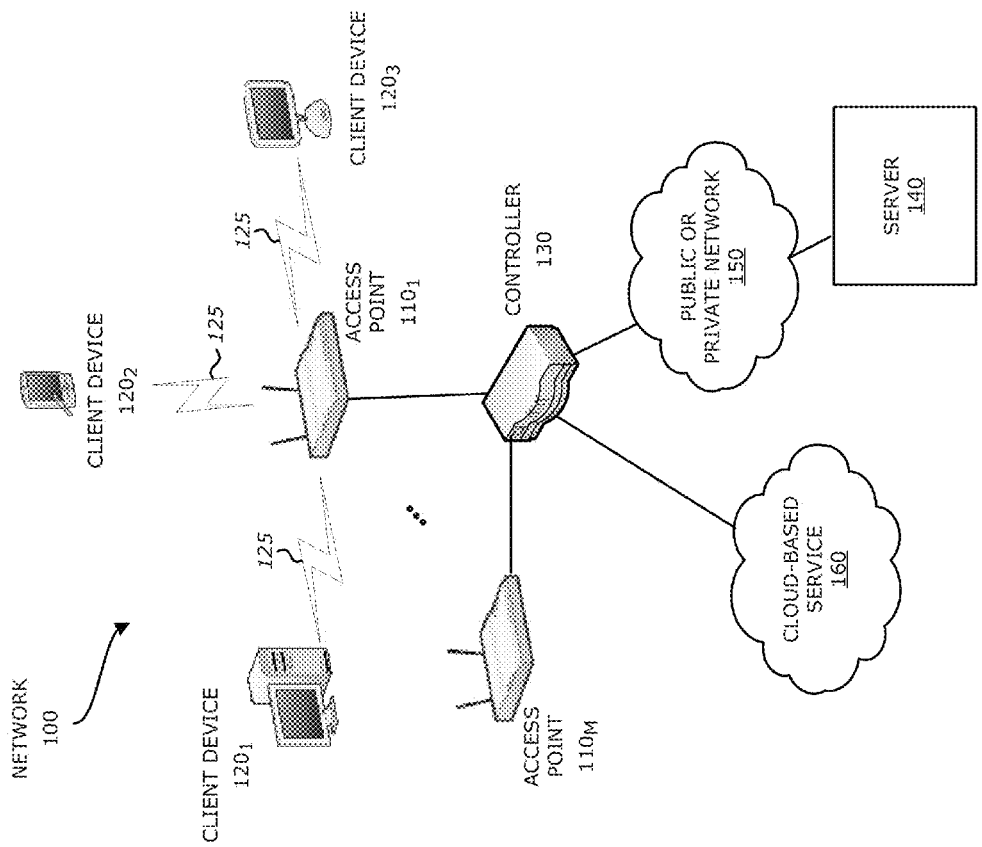
FIG. 1 is an exemplary block diagram of a network operating in accordance with one or more embodiments of the invention.

Various embodiments of the disclosure relate to a network device configured to correlate network usage information along with statistical information computed based on that network usage information to more accurately determine whether anomalous network behavior constitutes a network attack. Based on the analysis of both network usage information and its corresponding statistical information, the network device may trigger or suppress an alert message based on whether such anomalous network behavior constitutes an attack and whether the attack is "harmful" by adversely affecting network communication quality.

More specifically, on a periodic basic or perhaps an aperiodic basis, an access point (AP) transmits network usage information to a targeted network device (e.g. a controller, external server, or cloud-based service including one or more publicly accessible servers). The "network usage information" is detailed information collected by the AP pertaining to its wireless communications with each of its associated client devices. The targeted network device maintains records of network usage over predetermined period of time for each client device. These network usage records provide "snapshots" concerning network usage for that particular network device over a prolonged period of time.

From the information associated with a particular network usage record, statistical information, such as mean, standard deviation, median, or other statistic-based computations, may be calculated. By comparing statistical information computed from different network usage records, the targeted network device is able to better determine if anomalous network behavior detected by the AP constitutes an attack that is harmful to the network, and if not, it is able to suppress an alert message from being sent to the network administrator.

It is contemplated that the network usage information may include information received by other APs and different types of network devices besides client devices. Therefore, for this disclosure, the "client device" may be construed broadly as any network device that transmits wireless messages that may be monitored by another network device such as an access point.

I. Terminology

In the following description, certain terminology is used to describe features of the invention. For example, the term "network device" generally refers to any electronic device that includes processing circuitry running at least one process adapted to receive and/or control the flow of network traffic. Examples of a network device may include, but is not limited or restricted to a computer; tablet; laptop; desktop; netbook; television; receiver; set-top box; video gaming console; television peripheral; printer; mobile handset; smart phone; personal digital assistant "PDA"; wireless receiver and/or transmitter); an access point; a controller; a mainframe; and/or any type of server (e.g. web server, authentication server, authentication-authorization-accounting "AAA" server, Domain Name System "DNS" server, Dynamic Host Configuration Protocol "DHCP" server, Internet Protocol "IP" server, Virtual Private Network "VPN" server, or network policy server).

One type of network device, referred to as an "access point," operates as a gateway for the wired network and comprises a combination of hardware, software, and/or firmware that is configured to (1) analyze incoming messages to detect anomalous network behavior, which may identify the start of a network attack; (2) report detected anomalous network behavior; (3) maintain and update network usage information involving wireless communications with client devices; and (4) supply the network usage information in a periodic or aperiodic manner for intrusion detection verification.

It is contemplated that a network device may include hardware logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the term "logic" is representative of hardware, firmware or software that is configured to perform one or more functions. As hardware, logic may include circuitry such as processing circuitry (e.g., a microprocessor, one or more processor cores, a programmable gate array, a microcontroller, an application specific integrated circuit, etc.), wireless receiver, transmitter and/or transceiver circuitry, semiconductor memory, combinatorial logic, or other types of electronic components.

As software, logic may be in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but is not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code and/or data is stored in persistent storage.

The term "message" generally refers to a grouping of information, normally including a header and a payload, such as any of the following: a packet; a frame; a stream being a sequence of packets or frames; an Asynchronous Transfer Mode "ATM" cell; or any other series of bits having a prescribed format. The "payload" is generally defined as including the data associated with the message such as text, software, an image, an object, audio, video, a Uniform Resource Locator (URL), or other types of digital data. The "header" is generally defined as including control information, such as a media access control (MAC) header for a wireless message.

The term "attack" refers to an activity initiated by a network device that is designed to degrade the quality wireless communications between an access point (AP) and another network device, such as an associated client device. In essence, an attack adversely affects the connectivity between the AP and one or more of its associated client devices.

The term "interconnect" is a communication path between a source and a destination, such as between network devices or between logic within the network devices. Examples of interconnects may include electrical wiring, optical fiber, cable, bus trace, or a wireless channel using infrared, radio frequency (RF), or any other type of wired/wireless signaling technology.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architecture

Referring to FIG. 1, an exemplary block diagram of a network 100 operating in accordance with one or more embodiments of the invention is shown. Network 100 is a digital system that may include a plurality of network devices such as one or more access points $110_1$-$110_M$ (M≥1) and one or more client devices $120_1$-$120_N$ (N≥1). As shown, client devices $120_1$-$120_3$ are network devices that include a hardware processor, memory, and communication interfaces including a wireless interface such as any IEEE 802.11-based wireless interface as described in FIG. 2. The wireless interface may be used to communicate with access points $110_1$.

Access points $110_1$-$110_M$ may be any devices that can have client devices $120_1$-$120_N$ associated with it, and are capable of transmitting and receiving information over a wired or wireless interconnect, such as wireless channels 125 as shown. For instance, access point $110_1$ may correspond to a network device such as a wired access point, a wireless access point, a switch, a base station, a router, or any combination thereof. However, it is contemplated that access point $110_1$ also may be any device that may be configured as a hotspot (e.g., a cell phone, a tablet, a laptop, etc.).

Access point $110_1$ may have client devices $120_1$-$120_3$ associated with it as illustrated in FIG. 1, or only a subset of these client devices (e.g., client devices $120_1$-$120_2$) and within physical proximity of a non-associated client device (e.g. client devices $120_3$) to still receive and monitor wireless traffic from that client device. Also, access points $110_1$ may have client devices $120_1$-$120_3$ associated with it through a wired interconnect in lieu of wireless connectivity.

As described below, access point $110_1$ is communicatively coupled to a controller 130, and thus, controller 130 is adapted to receive information, such as network usage information and other control information, from access point $110_1$. This information may be utilized by controller 130 to perform intrusion detection verification in response to detection of anomalous network behavior by access point $110_1$.

Alternatively, controller 130 may receive and forward the network usage and control information to an external server 140 over another public and/or private network 150 or a cloud-based service 160 accessible via a public network such as the Internet. In lieu of controller 130, external server 140 or cloud-based service 160 may be configured to perform the intrusion detection verification described herein. This enables better maintenance of the records forming a large database of network usage information, as opposed to controller 130 which has limited computation power and storage capabilities.

Figure 2:
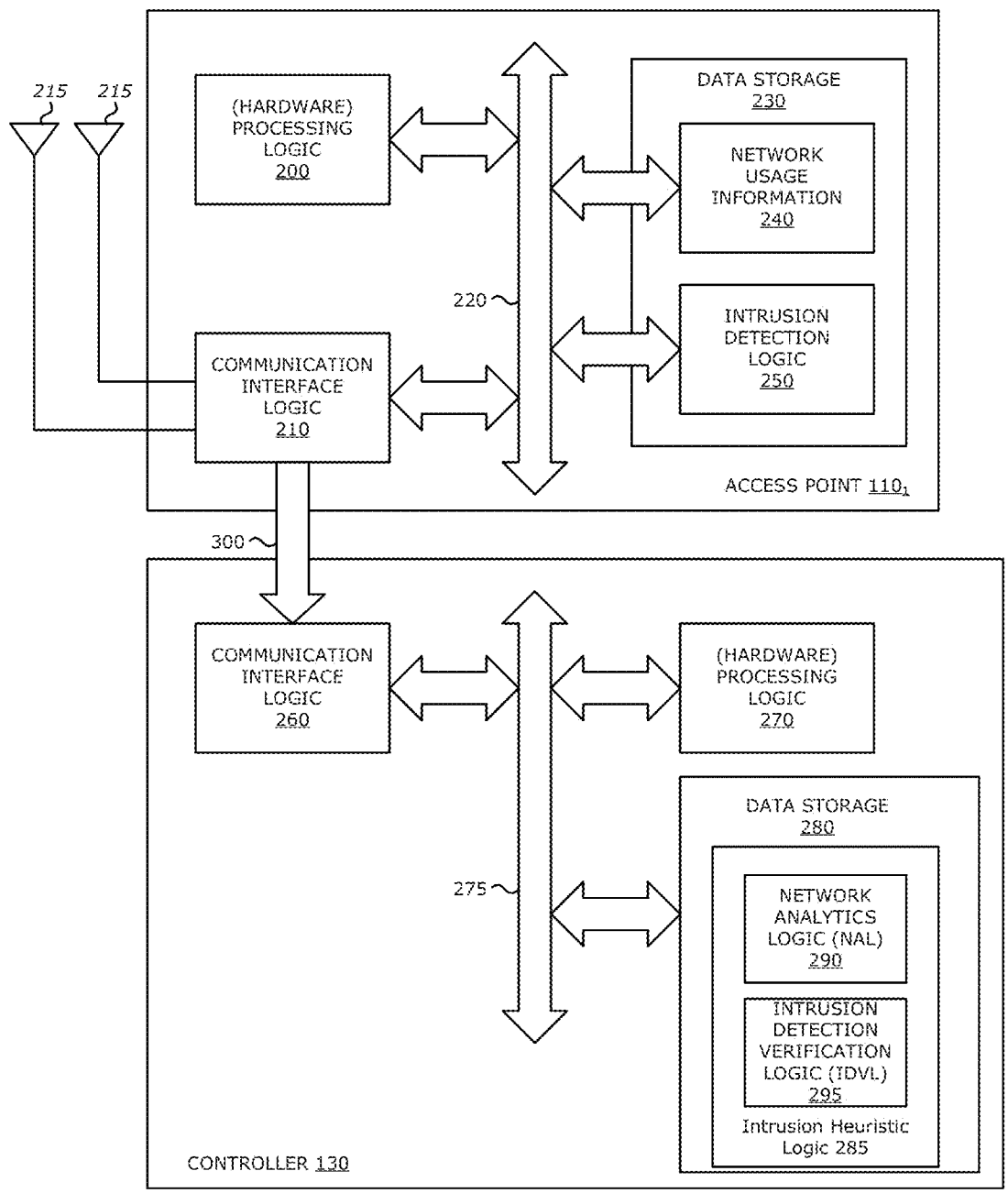
FIG. 2 is an exemplary block diagram illustrating communications between an access point and a network device to conduct intrusion detection verification to increase reliability in the reporting of network attacks to the network administrator.

Referring now to FIG. 2, an exemplary block diagram illustrating the communications between access point $110_1$ and a network device (e.g. controller 130) responsible for conducting intrusion detection verification is shown. Access point $110_1$ comprises processing logic 200 that is coupled to communication interface logic 210 via an interconnect 220. Communication interface logic 210 enables communications with other network devices such as controller 130. According to one embodiment of the disclosure, communication interface logic 210 may be implemented as a physical interface including one or more ports for wired connectors. Also, communication interface logic 210 may be implemented with one or more radio units 215 for supporting wireless communications with other network devices.

Processing logic 200 is further coupled to data storage 230 via interconnect 220. According to one embodiment of the disclosure, data storage 230 may include network usage information 240 and/or intrusion detection logic 250. Of course, when implemented as hardware, intrusion detection logic 250 would be implemented separately from data storage 230.

Network usage information 240 comprises information related to the communications received from client devices associated with access point $110_1$. Network usage information 240 may include parameters associated with network usage by a particular client device as well as network usage by a group of client devices. These parameters contained within network usage information 240 may include (i) the number of frames transmitted to a particular client device; (ii) the number of received frames; (iii) maximum negotiated rate; (iv) number of bytes and/or frames transmitted at each transmission rate; (v) number of frames received based on type; (vi) number of retransmissions (retries); (vii) measured signal strength; and/or (viii) channel utilization by the particular client device.

Network usage information 240 further includes information relating to broadcast and/or multicast messages (e.g. beacons), probe response messages, or other messages from network devices that are monitored within the wireless environment. This information is maintained by a wireless management system (WMS) process running on controller 130.

Intrusion detection logic 250 analyzes each incoming message in efforts to detect an intrusion event, which may be represented by anomalous network behavior. One technique for detecting an intrusion event may involve conducting lightweight heuristic analysis on the incoming message. For example, intrusion detection logic 250 may compare one or more parameters of an incoming message (e.g., a wireless IEEE 802.11-based frame) with one or more thresholds. According to one embodiment, these thresholds may be preset. If the parameter(s) exceed or fall under the corresponding threshold(s), this finding denotes anomalous network behavior. The presence of anomalous network behavior may identify that some entity or malicious network device is attacking the network by attempting to degrade the quality of wireless communications between access point $110_1$ and one or more of its associated client devices.

Thereafter, once an intrusion event has been detected, intrusion detection logic 250 generates a control message 300, which is transmitted to the network device responsible for conducting intrusion detection verification. For clarity sake, the network device is selected as controller 130, although other network devices may be used such as an external server or a cloud-based service.

Figure 3:
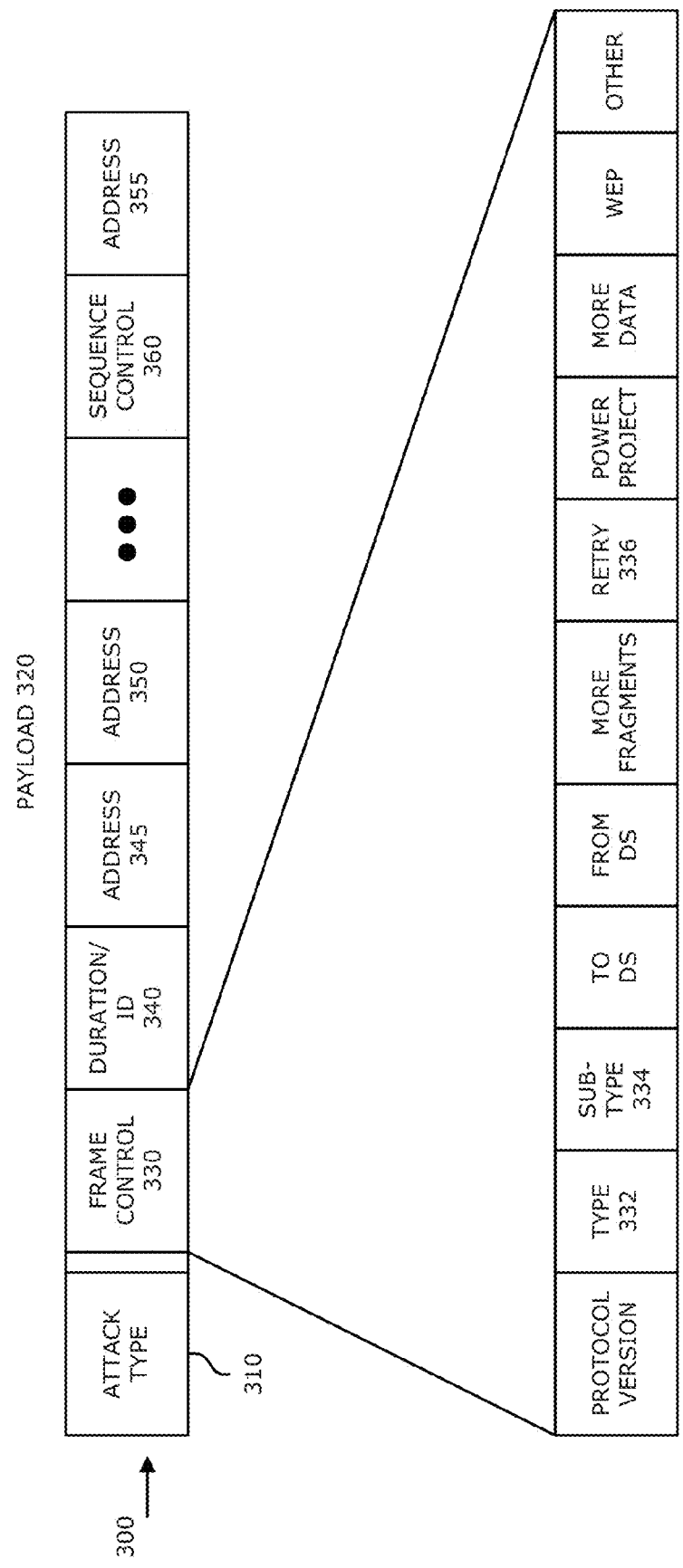
FIG. 3 is an exemplary embodiment of a control message transmitted from the access point to the network device (controller) upon detecting anomalous network behavior upon receipt of an incoming data frame.

As shown in FIG. 3, control message 300 includes information identifying a suspected attack type 310 (e.g., Duration attack, Block ACK attack, etc.) along with a payload 320. According to one embodiment of the disclosure, payload 320 may include parameters describing the suspected network attack corresponding to the intrusion event such as at least a source media access control (MAC) address and/or destination MAC address from the incoming message. According to another embodiment of the disclosure, access point $110_1$ may augment the information within payload 320 of control message 300, with all or part of the IEEE 802.11 header of the analyzed incoming frame. Hence, payload 320 may contain information such as frame type 332, sub-type 334 and retry 336 within Frame Control field 330; Duration 340; Source MAC address 345; Destination MAC address 350; Basic Service Set (BSS) MAC address 355; and Sequence Control 360. Given the type of attack suspected, in most cases, the IEEE 802.11 header should provide adequate information about cause of the attack.

As shown in FIG. 3, Frame Control field 330 contains control information used for defining the message type (e.g., type of IEEE 802.11 MAC frame) and providing information for processing this message type. A description of some of the subfields within Frame Control field 330 that may be utilized for intrusion detection verification are set forth below:

(1) Type 332—determines the function of the incoming message. There are three different message types: control, data, and management. Different types of messages (frames) have different behaviors such as data frames may be fragmented and of longer duration than control or management frames.

(2) Sub-type 334—identifies the specific function to be performed for its associated frame type. Different sub-types may have different behaviors.

(3) Retry 336—indicates whether or not the incoming message, such as data or management frame type, is being retransmitted.

Referring still to FIG. 3, Duration field 340 is used for all control type frames, except with the subtype of Power Save (PS) Poll, to indicate the remaining duration needed to receive the next message transmission.

Depending upon the frame type set forth in subfield 332, a plurality of address fields 345-355 are provides, which contain a combination of the following address types:

(1) Source MAC Address 345—indicates the MAC address of the original source network device that initially created and transmitted the message.
(2) Destination Address 350—indicates the MAC address of the final destination to receive the message.
(3) BSS Identifier (BSSID) 355—uniquely identifies each BSS. For instance, when the message is from a client device in an infrastructure BSS, the BSSID is the MAC address of the AP.

Referring still to FIG. 3, although not shown, Sequence Control field 360 contains two sub-fields, namely a sequence number sub-field and a fragment number sub-field. The sequence number is an incremented value assigned to each frame, where the sequence number is retained for all frames sent as a fragmented frame. Otherwise, the sequence number is incremented until a predetermined number is reached, where the sequence number returns to zero again.

Referring back to FIG. 2, controller 130 is communicatively coupled to access point $110_1$ by receiving control message 300 via communication interface logic 260. Controller 130 comprises communication interface logic 260 coupled to processing logic 270 and data store 280 via interconnect 275. According to one embodiment of the disclosure, data storage 280 may include intrusion heuristic logic 285, which uses pre-programmed heuristics defined for each type of attack that specifies the network information statistics that are needed as input for intrusion detection verification.

As shown, intrusion heuristic logic 285 comprises network analytics logic 290 and/or intrusion detection verification logic 295. Of course, when implemented as hardware, network analytics logic 290 and/or intrusion detection verification logic 295 would be implemented separately from data storage 280.

Network analytics logic 290 is adapted to maintain records, also referred to as "snapshots," of network usage information pertaining to communications between access point $110_1$ and one or more of its associated client devices over a predetermined period of time. Network analytics logic 290 is further adapted to generate statistical information for each of the network usage records. The statistical information (e.g., mean, standard deviation, etc.) may be used to analyze changes in network behavior by various client devices in order to better determine if anomalous network behavior is caused by a network attack.

Over a period of time, when the same client device is observed in the network, a distribution of the network usage/statistics may be formulated. This allows for a construction of a behavioral profile for that client device, which may be used to recognize any observed deviations from average behavior.

Furthermore, by comparing statistics associated with a current network usage record formed from recent network usage information with statistics associated with previous record(s) in the current or prior communication sessions along with the distribution of network usage/statistics, any anomalous network behaviors in communications between a client device and an AP may be determined.

The network usage information and the statistics maintained for each client device enable controller 130 to infer anomalous network behavior, such as, a high level of retransmissions to/from a client device, which could be caused by a Denial-of-Service (DoS) attack. The increased likelihood of the anomalous network behavior uncovered from analysis uses statistical informational derived from the network usage information acts as a verification of a network attack prior to triggering an alert message to a network administrator.

Similarly, by further using information from network devices that are monitored (but not associated) with any of access points $110_1$-$110_M$ of FIG. 1, a repository or database may be maintained for valid and/or malicious devices seen by the APs in this wireless environment. This allows for the transmission of an alert message whenever a malicious device is observed in the network and conducting an event (e.g., blacklist) to mitigate the threat of the malicious device adversely effecting the operations of the network.

Intrusion detection verification logic (IDVL) 295 is adapted to combine information from control message 300 provided by access point $110_1$ upon detection of anomalous network behavior that denotes a suspected intrusion event and data available from network analytics logic 290.

Upon access point $110_1$ signaling an intrusion event and forwarding control message 300, which includes all or part the 802.11 frame header of the analyzed incoming frame, controller 130 analyzes the network statistics produced by NAL 290 from network usage information provided by the AP. The network usage information may be directed to a particular client device identified from the source MAC address in the 802.11 frame or information from all clients in the most current record (snapshot).

More specifically, one or more parameters within the current network usage record may be compared with earlier observed parameters. If the most current record shows significant deviation from the earlier time points or expected past behavior, then the current intrusion event will be escalated to cause an alert message to be transmitted to the network administrator, or else the alert message will be suppressed.

In addition, if the network analytics logic 290 triggers an alert message and after a certain, pre-defined period of time, it is indicated by an AP or multiple APs that a particular client device or the entire wireless network is experiencing an intrusion attack, then this event is noted as already being verified. Hence, another alert message is generated and provided to the network administrator without additional intrusion detection verification.

In both of these scenarios, the particulars of the attack such as the message from the AP and the records (snapshots) of the network usage information at the time of the attack are saved in a repository for comparison in the event of future attacks. This information is fed back to network analytics logic 290, and helps trigger alert messages when anomalies are observed in the snapshot of network usage statistics.

Over time, when a large amount of data regarding network anomalies has been gathered, this data can be used as input to construct classifiers for intrusion event notification and suppression. This will be explained with the help of illustrative examples in the handling of the Duration attack and Block-ACK attack as described below and illustrated in FIGS. 5-6.

Figure 4:
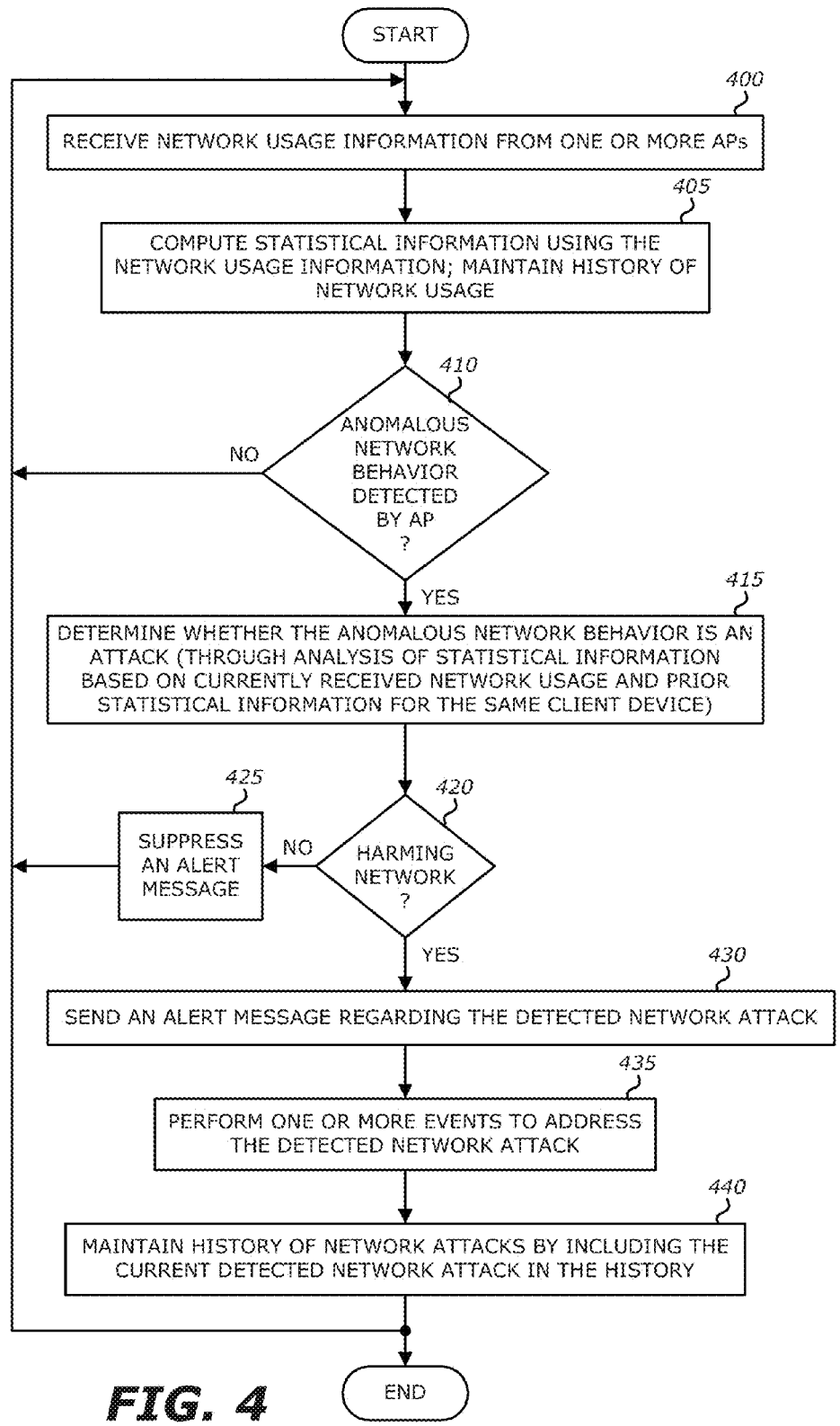
FIG. 4 is an exemplary flowchart of the operations conducted in the intrusion detection verification analysis.

Referring to FIG. 4, an exemplary flowchart of the operations conducted for intrusion detection verification is shown. Herein, as set forth in block 400, network usage information is received from one or more access points (APs).

Rather, based on the network usage information, statistical information may be computed for use in inferring if a network attack is in progress and the effects of the network attack (block 405). Also, the history of the network usage may be maintained through network usage records that include (i) network usage information gathered by a particular AP over a predetermined period of time for communications by a particular client device associated with that AP, and/or (ii) network usage information gathered by the particular AP over the predetermined period of time for communications by all or a selected grouping of client devices to provide a collective "snapshot" of network usage by these client devices.

Upon receipt of the control message from the access point, which identifies detection of anomalous network behavior (block 410), a portion of the control message is accessed to determine the client device that transmitted the incoming message resulting in the control message. Based on that information, statistical information for one or more network usage records pertaining to communications between the client device and the AP is compared to current and perhaps future network usage information provided by the AP for the client device. Upon determining unacceptable variations in statistical information, the anomalous network behavior can be inferred as a network attack (block 415).

If a network attack is detected, a determination may be made whether the attack is adversely affecting network quality, such as decreased network throughput below a first threshold or an increase in number of retries above a second threshold for example (block 420). If not, an alert message directed to the detected attack is suppressed since the suspected attack currently has no appreciable effect on network performance (block 425). Similarly, if the attack is adversely affecting network quality, an alert message is sent to advise the network administrator of the network attack and one or more events are performed to address the detected attack (blocks 430 and 435). For instance, the intruding network device may be de-authenticated and blacklisted to prevent re-entry on the network.

Information associated with the suspected network attack, such as the particulars of the control message and records of network usage information at the time of the attack are stored in a repository (block 440). This allows the information to be accessible for comparison purposes in the event of a future attack. The information may also be used to triggered alert messages due to anomalies in the records having the network usage statistics.

Figure 5:
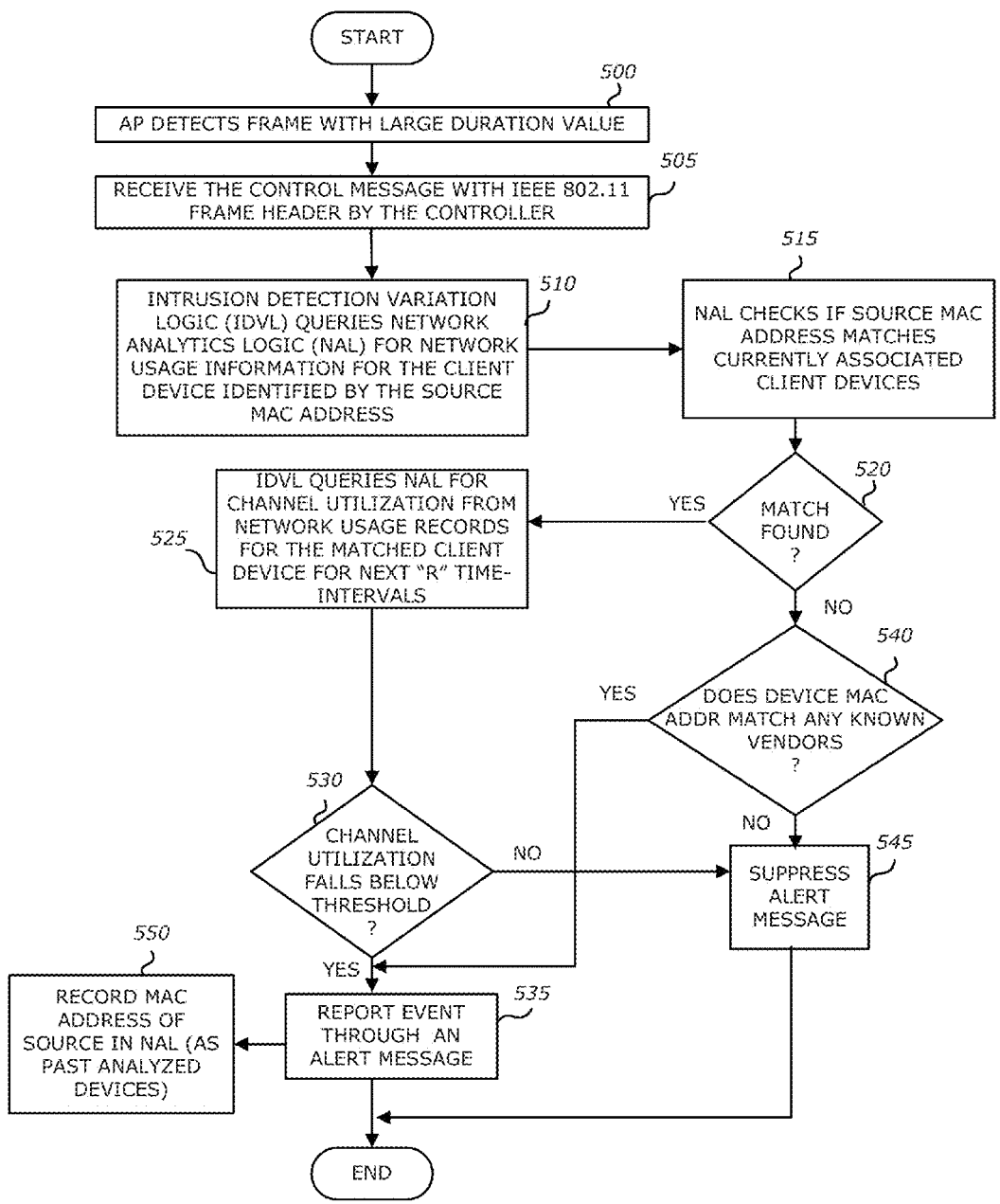
FIG. 5 is an exemplary flowchart of the operations conducted for intrusion detection in response to detection of a suspected Duration attack.

Referring now to FIG. 5, an exemplary flowchart of the operations conducted for intrusion detection verification in response to detection of a potential Duration attack is shown. In a Duration attack, the duration value within a frame is set to a large value in order to prevent channel access to legitimate users. Under normal circumstances, the only time an ACK frame carries a large duration value is when the ACK is part of a fragmented packet sequence. A data frame legitimately carries a large duration value only when it is a sub-frame in a fragmented packet exchange.

Upon detecting a frame with a large duration value (e.g., exceeding a pre-set threshold), an access point (AP) sends a control message to the controller, where the control message identifies the suspected attack type and contains the 802.11 frame header as set forth in FIGS. 2-3 (blocks 500 and 505).

On receiving the control message from the AP, the Intrusion Detection Verification logic (IDVL) of the controller will query the Network Analytics logic (NAL) for client network usage information using the source address in the 802.11 frame header (block 510).

If the client device is currently associated to the AP, then the frame is a valid frame (blocks 515-520). Hence, for a select number of time periods "R" (R≥1), the IDVL obtains channel utilization from future network usage records for the client device in order to determine if the channel utilization fell below a threshold (e.g., adversely affected by the detected frame having a large duration) as set forth in block 525. Upon observing that the channel utilization is less than the threshold (e.g. two standard deviation from the average channel utilization as provided by prior network usage records), the IDVL causes the controller to issue a Duration attack alert message to the network administrator (blocks 530 and 535). Otherwise, the alert message will be suppressed (block 545).

If the source MAC address does not match the MAC address of client devices currently associated with the AP (block 520), then the large duration frame originated from a malicious network device or is a malformed frame (having errors). The determination whether the frame is malformed (has errors) may be accomplished by comparing the device MAC address supplied with the control message with known vendor MAC addresses (block 540). If a match is not detected, the frame is considered to be malformed, and thus, the alert message is suppressed (block 545). Otherwise, the event is immediately reported or channel utilization can be monitored (blocks 535 or 525).

In case of the malicious device, the device MAC address would be recorded in the NAL in case the same network device triggers an attack in the future (blocks 550). A record of this event would help classify new events which have same signature as earlier recorded ones.

Figure 6:
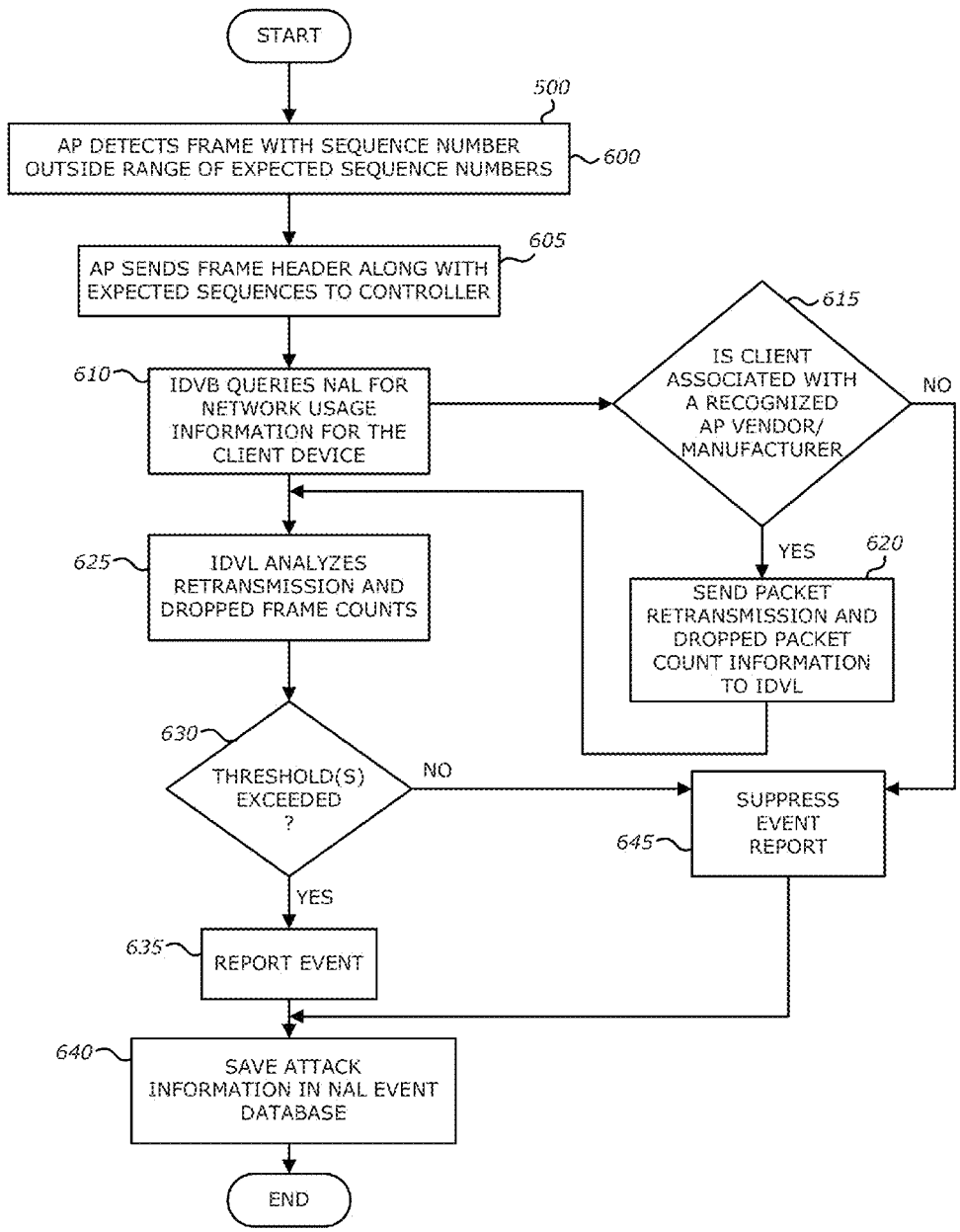
FIG. 6 is an exemplary flowchart of the operations conducted for intrusion detection in response to detection of a suspected Block-ACK attack.

Referring to FIG. 6, an exemplary flowchart of the operations conducted for intrusion detection verification in response to a Block-ACK attack is shown. For a Block-ACK attack, a potential attacker sends spoofed frames, which advertise a different sequence window from that expected by a receiver (client device), causing the client device to drop valid packets that it perceives as out of order.

When analyzing incoming frames for intrusion detection, upon detecting a frame that is outside the expected range of sequence numbers for an associated client device, the AP transmits a control message to the controller. The control message identifies the suspected attack type as a Block-ACK attack along with the 802.11 header for the detected frame (blocks 600 and 605).

On receiving the control message from the AP, the IDVL queries the NAL for network usage information (e.g., network usage records) for the client device identified by the source MAC address in the 802.11 frame header (block 610).

Upon observing that the client device is associated to an AP from a recognized entity (e.g., manufacturer, vendor, retailer, etc.), the NAL accesses the most current network usage record for the client device as well as information with the transmitted IEEE 802.11 header, and thereafter, transmits information therefrom (Blocks 615 and 620). More specifically, according to this embodiment, the NAL transmits the number of retransmissions (retries) and/or number of frames dropped by the client device to the IDVL.

In response, the IDVL determines if number of retransmissions exceeds a threshold, such as two standard deviations higher than the average number of retransmissions for example (blocks 625 and 630). If so, the IDVL will escalate this event, and trigger an alert message (block 635). The event will reported and its details will be stored in the NAL to help verify future intrusion events (block 640).

If the number of retransmissions does not exceed the threshold, then this event is recorded in our NAL database as a false positive and serves to suppress any intrusion events having similar signature-network usage information view for the client device (blocks 640 and 645). In either case, a record for the current event helps establish the veracity of future events signaled by the AP.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A non-transitory storage medium including software that, when executed by one or more hardware processors, performs the operations comprising:

receiving, from a first network device, an indication of anomalous network behavior detected by the first network device, wherein the detected anomalous behavior comprises receiving a frame that is outside an expected range of sequence numbers for a client device associated with the first network device;

analyzing statistical information of network usage comprising at least a number of prior retransmissions by the client device; and generating an alert message in response to the number of prior retransmission by the client device exceeding a threshold value.

2. The medium of claim 1 further comprising:

suppressing the alert message in response to the number of prior retransmissions by the client device not exceeding the threshold value.

3. The medium of claim 1 further comprising:

suppressing the alert message in response to the anomalous network behavior not associated with the network attack that is adversely affecting communication quality over a network more than a prescribed level.

4. The medium of claim 1 further comprising:

transmitting a control message by the first network device, the control message identifying that the anomalous network behavior is directed to a Block-ACK network attack.

5. The medium of claim 1, wherein the control message includes at least an identifier of a suspected type of network attack associated with the anomalous network behavior and one or more parameters describing the suspected network attack including at least a source media access control (MAC) address from an incoming message that caused detection of the anomalous network behavior, wherein the client device is a source of the incoming message, and the source MAC is for the client device, and wherein the analyzing of the statistical information comprises accessing prior network usage information associated with the source MAC of the incoming message prior to receipt of the incoming message, and the operations further comprise comparing the one or more parameters within the prior network usage information to determine whether to generate the alert message, wherein the one or more parameters include the number of prior retransmissions.

6. The medium of claim 4, wherein the control message including an identifier of a suspected type of network attack associated with the anomalous network behavior and at least a portion of a media access control (MAC) address header from an incoming IEEE 802.11-based frame that caused detection of the anomalous network behavior.

7. The medium of claim 5, wherein the one or more parameters within the network usage information include channel utilization by the source of the incoming message.

8. The medium of claim 5, wherein the one or more parameters within the network usage information include a dropped frame count by the source of the incoming message.

9. The medium of claim 1, wherein the first network device is a controller.

10. The medium of claim 1, wherein the information associated with detected anomalous network behavior is provided from an access point.

11. A system comprising:

at least one network device including a hardware processor;

the system to perform a plurality of operations comprising:

receiving, from a first network device, an indication of anomalous network behavior detected by the first network device, wherein the detected anomalous behavior comprises receiving a frame that is outside an expected range of sequence numbers for a client device associated with the first network device;

analyzing statistical information of network usage comprising at least a number of prior retransmissions by the client device; and generating an alert message in response to the number of prior retransmissions by the client device exceeding a threshold value.

12. The system of claim 11, wherein the plurality of operations further comprises:

suppressing the alert message in response to the number of prior retransmissions by the client device not exceeding the threshold value.

13. The system of claim 11, wherein the plurality of operations further comprises:

suppressing the alert message in response to the anomalous network behavior not associated with the network attack that is adversely affecting communication quality over a network more than a prescribed level.

14. The system of claim 11, wherein the plurality of operations further comprises:

transmitting a control message by the first network device, the control message identifying that the anomalous network behavior is directed to a Block-ACK network attack.

15. The system of claim 11, wherein the control message includes at least an identifier of a suspected type of network attack associated with the anomalous network behavior and one or more parameters describing the suspected network attack including at least a source media access control (MAC) address from an incoming message that caused detection of the anomalous network behavior, wherein the client device is a source of the incoming message, and the source MAC is for the client device, and wherein the analyzing of the statistical information comprises accessing prior network usage information associated with the source MAC of the incoming message prior to receipt of the incoming message, and the plurality of operations further comprise comparing the one or more parameters within the prior network usage information to determine whether to generate the alert message, wherein the one or more parameters include the number of prior retransmissions.

16. The system of claim 14, wherein the control message including an identifier of a suspected type of network attack associated with the anomalous network behavior and at least a portion of a media access control (MAC) address header from an incoming IEEE 802.11-based frame that caused detection of the anomalous network behavior.

17. The system of claim 15, wherein the one or more parameters within the network usage information include channel utilization by the source of the incoming message.

18. The system of claim 15, wherein the one or more parameters within the network usage information include a dropped frame count by the source of the incoming message.

* * * * *